United States Patent
Pal

(10) Patent No.: US 10,174,767 B2
(45) Date of Patent: Jan. 8, 2019

(54) SUPPLEMENTAL COOLING OF CABIN AIR COMPRESSOR MOTOR

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 607 days.

(21) Appl. No.: 14/790,760

(22) Filed: Jul. 2, 2015

(65) Prior Publication Data

US 2017/0005544 A1   Jan. 5, 2017

(51) Int. Cl.
*F04D 29/58*   (2006.01)
*F04D 25/06*   (2006.01)
(Continued)

(52) U.S. Cl.
CPC ......... *F04D 29/5806* (2013.01); *B64D 13/00* (2013.01); *B64D 13/02* (2013.01);
(Continued)

(58) Field of Classification Search
CPC .. F04D 13/0693; F04D 25/082; F04D 29/584; F04D 29/5846; F04D 29/5806;
(Continued)

(56) References Cited

U.S. PATENT DOCUMENTS

| 1,883,648 A | * | 10/1932 | Emanueli | H01B 9/0611 |
| | | | | 174/116 |
| 2,776,385 A | * | 1/1957 | Modrey | H01B 7/0072 |
| | | | | 174/16.1 |

(Continued)

FOREIGN PATENT DOCUMENTS

| EP | 2607653 A2 | 6/2013 |
| FR | 1222734 A | 6/1960 |

(Continued)

OTHER PUBLICATIONS

Extended European Search Report for EP Application No. 16177722.2, dated Nov. 21, 2016, 9 pages.

*Primary Examiner* — Peter J Bertheaud
(74) *Attorney, Agent, or Firm* — Kinney & Lange, P.A.

(57) ABSTRACT

An assembly includes a first conductor, a tube extending along the first conductor between first and second ends of the first conductor, and an electrically-insulating barrier surrounding the first conductor and the tube such that the tube is spaced from the first conductor. Another assembly includes a plurality of conductors, a first tube extending along at least one of the conductors, and an electrically-insulating barrier enclosing the conductors and the first tube in which the barrier maintains spacing between the first tube and one or more adjacent conductors. In each assembly, the tube is configured to permit a fluid to flow therethrough. A method of manufacturing a feeder cable includes providing conductors that extend between first and second lugs of each conductor, enclosing the conductors within an electrically-insulating layer, and forming a cooling passage within the electrically-insulating layer that extends along one of the conductors.

17 Claims, 8 Drawing Sheets

(51) Int. Cl.
  *F04D 13/06* (2006.01)
  *H01B 7/00* (2006.01)
  *B64D 13/02* (2006.01)
  *B64D 13/00* (2006.01)
  *H02K 5/20* (2006.01)
  *H02K 9/00* (2006.01)
  *F04D 25/08* (2006.01)
  *B64D 13/06* (2006.01)
  *B64D 33/02* (2006.01)

(52) U.S. Cl.
  CPC ..... *F04D 13/0693* (2013.01); *F04D 25/0693* (2013.01); *F04D 29/584* (2013.01); *F04D 29/5846* (2013.01); *H01B 7/0072* (2013.01); *H02K 5/20* (2013.01); *H02K 9/005* (2013.01); *B64D 2013/0614* (2013.01); *B64D 2013/0644* (2013.01); *B64D 2033/024* (2013.01); *F04D 25/082* (2013.01); *Y02T 50/56* (2013.01)

(58) Field of Classification Search
  CPC ... F04D 25/0693; H01B 7/0072; B64D 13/00; B64D 13/02; B64D 13/04; B64D 13/06; B64D 2013/0644
  USPC ......................................................... 417/368
  See application file for complete search history.

(56) References Cited

U.S. PATENT DOCUMENTS

| | | | | |
|---|---|---|---|---|
| 2,910,524 | A * | 10/1959 | Schaffhauser | F16L 11/12 174/15.6 |
| 3,603,718 | A * | 9/1971 | Gedenk | H01B 9/0611 174/113 R |
| 5,146,982 | A * | 9/1992 | Dinkins | E21B 17/206 166/65.1 |
| 5,269,377 | A * | 12/1993 | Martin | E21B 17/003 166/385 |
| 5,350,281 | A * | 9/1994 | Hagshenas | F04D 25/082 415/144 |
| 6,164,084 | A | 12/2000 | Watson et al. | |
| 7,302,804 | B2 | 12/2007 | Murry et al. | |
| 8,847,069 | B2 * | 9/2014 | Emme | H01B 7/423 174/15.1 |
| 8,863,548 | B2 | 10/2014 | Hipsky | |
| 9,725,997 | B2 * | 8/2017 | Pinkston | E21B 17/206 |
| 9,734,936 | B2 * | 8/2017 | Hassel | H01B 7/0072 |
| 2004/0261428 | A1 | 12/2004 | Murry et al. | |
| 2015/0035392 | A1 | 2/2015 | Pal | |

FOREIGN PATENT DOCUMENTS

FR     2710923 A1   4/1995
WO   WO2005/124095 A1   12/2005

* cited by examiner

SUPPLEMENTAL COOLING OF CABIN AIR COMPRESSOR MOTOR

BACKGROUND

The present invention relates generally to cooling electric motors, and more particularly, to cooling high power, compact electric motors in aircraft.

Electric motors are used to drive a variety of mechanical components such as compressors, drive shaft components, and the like. In each application, electric power supplied to the motor creates heat. Generally, as the motor power increases, heat generated by the motor also increases. In some applications, the power density requires the motor to be actively cooled, for example, by air received by the component driven by the motor. Additionally, some applications utilize a cooling medium having physical properties that vary during operation. In some applications, physical property changes of the cooling medium can reduce the cooling efficiency of the electric motor.

In some aircraft, one or more cabin air compressors (CAC) are used to provide compressed air to a passenger cabin. Within cabin air compressors, an electric motor drives a radial compressor. Because of weight and physical constraints on the aircraft, the electric motor must be high power relative to its compact size. Thus, the power density of the electric motor requires cooling of the motor to maintain an acceptable motor temperature. Typically, the electric motor receives cooling air from the inlet duct of the compressor, which communicates with air exterior to the aircraft. As the aircraft increases altitude, the air density decreases. The lower air density causes decreased cooling efficiency and increased electric motor temperatures. Higher temperatures in the electric motor can lead to decreased motor life and/or premature electrical failure of the insulating materials contained within the motor. Thus, a need exists for improved cooling of electric motors, and specifically, for electric motors used in CAC of aircraft.

SUMMARY

In one aspect of the invention, an assembly includes a first conductor extending from a first end to a second end, a tube extending along the first conductor between the first and second ends, and an electrically-insulating barrier surrounding the first conductor and the tube such that the tube is spaced from the first conductor. The tube is configured to permit a fluid to flow therethrough.

In another aspect of the invention, an assembly includes a plurality of conductors, a first tube extending along at least one of the conductors, and an electrically-insulating barrier enclosing the conductors and the first tube. The barrier maintains spacing between the first tube and one or more adjacent conductors, and the tube is configured to permit a fluid to flow therethrough.

In yet another aspect of the invention, a method of manufacturing a feeder cable includes providing a plurality of conductors that extend between first and second lugs of each conductor, enclosing the plurality of conductors within an electrically-insulating layer, and forming a cooling passage within the electrically-insulating layer. The cooling passage extends along one of the conductors. The feeder cable is configured to electrically connect an electric motor to a power source.

DETAILED DESCRIPTION

Figure 1:
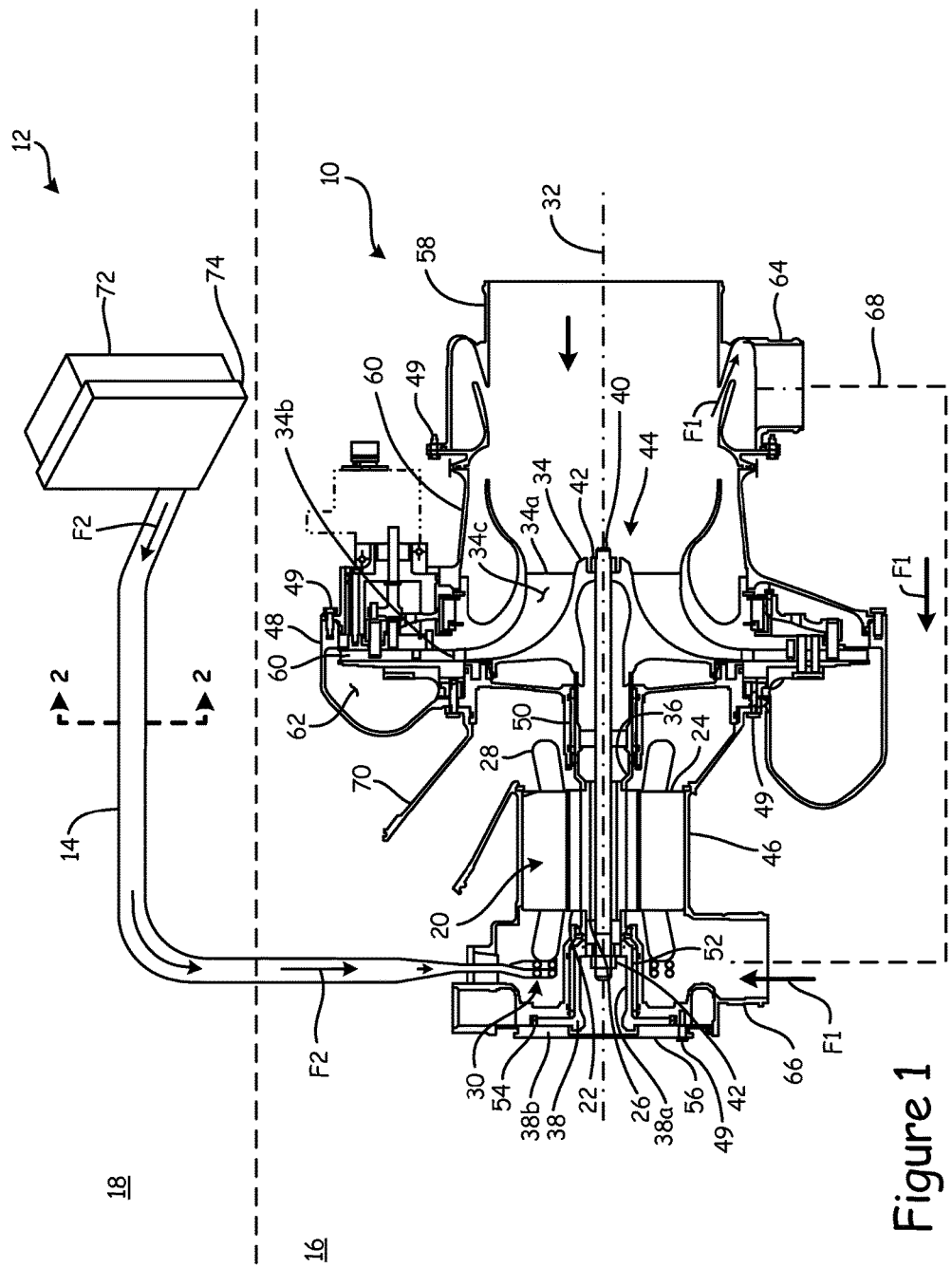
FIG. 1 is a schematic view of a cabin air compressor that receives supplemental cooling air through an integrated power and cooling cable.

FIG. 1 is a schematic view of cabin air compressor 10 that receives cooling air from cabinet 12 through integrated power and cooling cable 14. Compressor 10, cabinet 12, and cable 14 are installed on an aircraft in which compressor 10 is installed within ambient pressure zone 16, cabinet 12 is installed within pressurized zone 18, and cable 14 extends between zones 16 and 18 from cabinet 12 to compressor 10. Cabinet 12 houses various electrical components including one or more motor controllers that provide electric power and/or control signals through cable 14 for operating compressor 10. Compressor 10 intakes ambient air exterior to the aircraft and increases the ambient air pressure, generating compressed air. The compressed air is discharged from compressor 10 and delivered to a passenger cabin of the aircraft. As will be discussed in greater detail below, compressor 10 includes electric motor 20 that is cooled with primary air flow F1 and secondary air flow F2 in which flow F2 passes through cable 14 in addition to electric power and/or control signals used to operate electric motor 20.

Electric motor 20 includes rotor 22 and stator 24. Rotor 22 is mounted to hub 26. Stator 24 is disposed concentrically about rotor 22 having windings 28 disposed within slots (not shown) of stator 24. Windings 28 include terminals 30 at an end of stator 24 to interface with cable 14. In accordance with conventional motors, electric power supplied through cable 14 generates an electric field within windings 28. When windings 28 are arranged in multiple phases and electric power is supplied to each in a phased relationship, a rotating magnetic field is produced. Rotor 22, which can be an assembly of permanent magnets or electromagnets, rotates about axis 32 as a result of the rotating magnetic field. Thus, electric motor 20 uses electrical power to produce mechanical work.

In addition to electric motor 20, compressor 10 includes, among other components, impeller 34, rotor shaft 36, end shaft 38, tie rod 40, and nuts 42 that are concentrically disposed about axis 32 and together form rotor assembly 44. Rotor shaft 36 extends between hub 26 and impeller 34 to rotatably and axially restrain impeller 34 relative to hub 26. End shaft 38 extends from an end of hub 26 that is opposite rotor shaft 36. Tie rod 40 extends through impeller 34, rotor shaft 36, hub 26, and end shaft 38 along axis 32, in which each component is configured such that tie rod 40 and nuts 42 axially restrain the components with respect to each other.

For enclosing rotor assembly 44, compressor 10 includes motor housing 46 and compressor housing 48, which are connected to each other by fasteners 49 to form a contiguous housing. Rotor assembly 44 is radially supported within housings 46 and 48 by journal bearings 50 and 52 and axially restrained with housings 46 and 48 by thrust bearing 54. Journal bearings 50 and 52 are concentrically disposed about axis 32. Bearing 50 is positioned between rotor shaft 36 and a portion of compressor housing 48, and bearing 52 is positioned between end shaft 38 and motor housing 46. End shaft 38 has axially-extending portion 38a for interfacing with bearing 52 and radially-extending flange 38b for interfacing with thrust bearing 54. Because impeller 34 tends to force rotor assembly 44 towards electric motor 20, thrust bearing 54 is disposed between radially extending flange 38b of end shaft 38 and end plate 56 to restrain rotor assembly 44 in an axial direction parallel to axis 32. End plate 56 is attached to motor housing 46 by fasteners 49. Thus, rotor assembly 44 is supported within housings 46 and 48 such that electric motor 20 rotationally drives impeller 34.

Impeller 34 has inlet 34a and outlet 34b. Inlet 34a is oriented to receive ambient air along a generally axial direction, and outlet 34b is oriented to discharge ambient air, now compressed, in a generally radially direction as shown in FIG. 1. Inlet duct 58 and intermediate duct 60, which are attached together and to housing 48 with fasteners 49, enclose inlet 34a of impeller 34 and form an axially-oriented flow path in flow communication with ambient air exterior to the aircraft. As impeller 34 rotates, ambient air received through intermediate ducts 58 and 60 is redirected by blades 34c along impeller 34 from inlet 34a to outlet 34b, thereby compressing the ambient air. Compressed air discharged from outlet 34b is guided along scroll vane section 61 and into scroll duct section 62 whereby a dynamic pressure of the compressed air exiting impeller 34 is recovered, increasing a static pressure of the compressed air. The scroll section 62 of compressor housing 48 is in flow communication with the passenger cabin for delivering the compressed air.

Inlet duct 58 includes motor cooling outlet 64 for extracting a portion of the ambient air prior to entering impeller 34. Motor housing 46 has motor cooling port 66 for receiving cooling air that is delivered from motor cooling outlet 64 via ducting 68 (shown schematically in FIG. 1). Because rotor 22 and/or stator 24 contain one or more slots extending in a lengthwise direction parallel to axis 32, the rotation of rotor 22 draws cooling air from motor cooling port 66 through electric motor 20. Heat generated by electric motor 20 is extracted by the cooling air, which is discharged at motor outlet duct 70. Duct 70 is disposed at an end of motor housing 46 that is generally opposite an end having motor cooling port 64. Thus, a primary cooling flow F1 is established in which ambient air is extracted from inlet duct 58 and delivered to motor housing 48 where it is used to cool electric motor 20 before being discharged from duct 70.

However, a mass flow rate of primary cooling flow F1 is limited by a pressure drop caused by flow through the slots of rotor 22 and/or the slots of stator 24 as well as flow through a gap between rotor 22 and stator 24. When the aircraft increases altitude, the inlet pressure and density of the ambient air decreases. Decreased inlet pressure reduces the amount of flow through electric motor 20 and decreased air density reduces the cooling efficiency of the air. At the same time, the work required by compressor 10 and, therefore, electric motor 20 to compress the ambient air is greatest. As such, it is possible that the cooling air available to cool electric motor 20 is insufficient at elevated altitude.

Cable 14 is used to form secondary flow path F2 in addition to providing a conduit for electric power and/or control signals to electric motor 20. Generally, cable 14 extends from cabinet 12 located in pressurized zone 18 to electric motor 20 in ambient pressure zone 16 of the aircraft. Cabinet 12, (e.g., a High Voltage Direct Current (HVDC) cabinet), includes rack 72 configured to house electrical components and panel 74 for providing electrical interfaces to the electrical components. Rack 72 and panel 74 are attached along mating faces to facilitate electrical connections (e.g., bus bars) between the components housed in rack 72 and the interfaces (e.g., lugs, terminals, and the like) in panel 74. In some embodiments, which will be described in greater detail below, rack 72 houses one or more motor controllers that are electrically connected to bus bars located in panel 74. Cable 14 interfaces with the bus bars at lugs corresponding to each bus bar. Conductors within cable 14 transmit the electrical power and/or motor control signals to electric motor 20. Additionally, cable 14 includes one or more tubes sized to deliver secondary cooling flow F2 that originates from within panel 74 to motor housing 46 to augment cooling of electric motor 20.

Figure 2A:
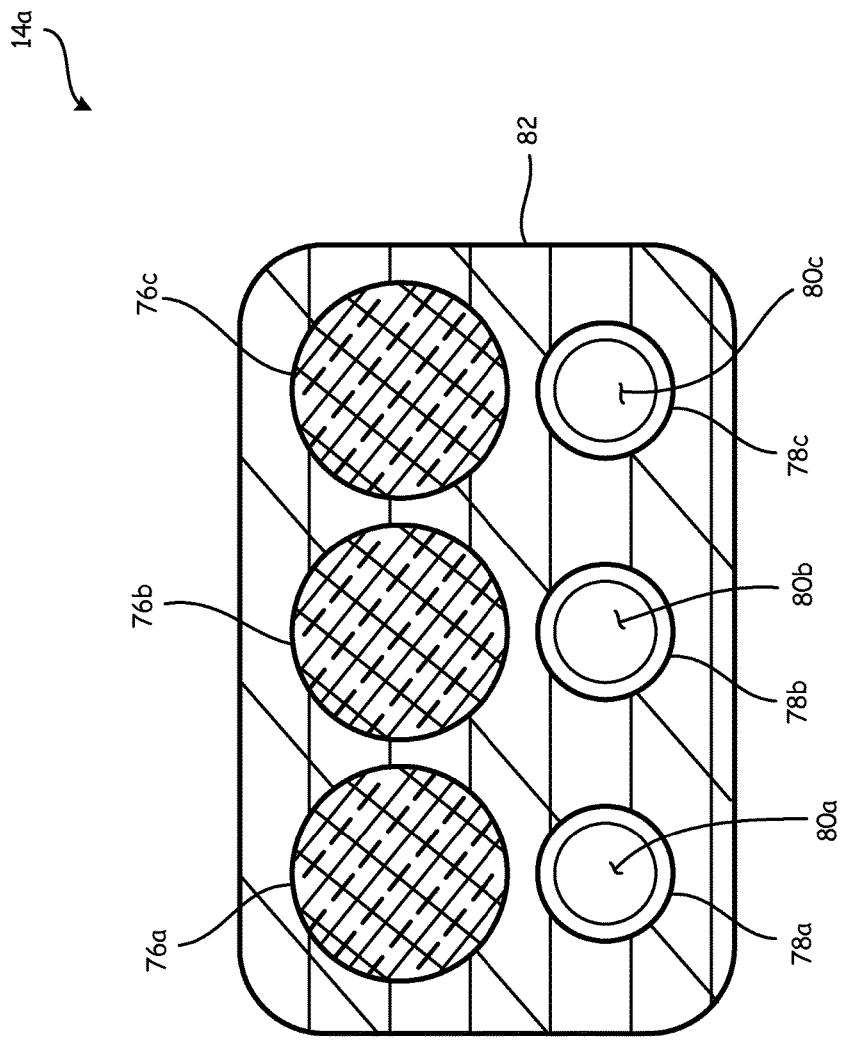
FIG. 2A is a cross-sectional view taken along line 2-2 in FIG. 1 that shows a first configuration of the integrated power and cooling cable.

FIG. 2A is a cross-sectional view taken along line 2-2 in FIG. 1 showing one embodiment of integrated power and cooling cable 14a. Cable 14a has three conductors 76a, 76b, and 76c. Although any suitable electrically conductive material can be used, typically, conductors 76a, 76b, and 76c and other conductor configurations to be described hereafter are composed of copper or a copper alloy. Any of these conductors (i.e., conductors 76a, 76b, and 76c) can have a solid cross-section or can be composed of multiple wires formed into a bundle. Even though FIG. 2A and other figures described hereafter show conductors 76a, 76b, and 76c having a solid cross section, it is intended that the hatching indicates either a solid cross-section or bundled wire configurations. Cable 14a has three tubes 78a, 78b, and 78c spaced from conductors 76a, 76b, and 76c, which form passages 80a, 80b, and 80c, respectively. Each tube 78a, 78b, and 78c extends along one or more of the conductors 76a, 76b, and 76c. The paths of tubes 78a, 78b, and 78c are complementary to but generally offset from the paths formed by conductors 76a, 76b, and 76c. Conductors 76a, 76b, and 76b and tubes 78a, 78b, and 78c are surrounded by electrically insulating layer 82, which maintains spacing between adjacent conductors and tubes. In the embodiment shown in FIG. 2A, conductors 76a, 76b, and 76c are arranged in a first row and are substantially equally spaced. Likewise, tubes 78a, 78b, and 78c are arranged in a second row that is parallel to the first row. Spacing between adjacent conductors and tubes is determined by the dielectric strength of electrically-insulating material 82 which can be determined using conventional methods. Conductors 76a, 76b, and 76c and tubes 78a, 78b, and 78c have circular cross-sections although other suitable cross-sections can be used. Each cross-section diameter is not necessarily the same as the other cross-section diameters.

Figure 2B:
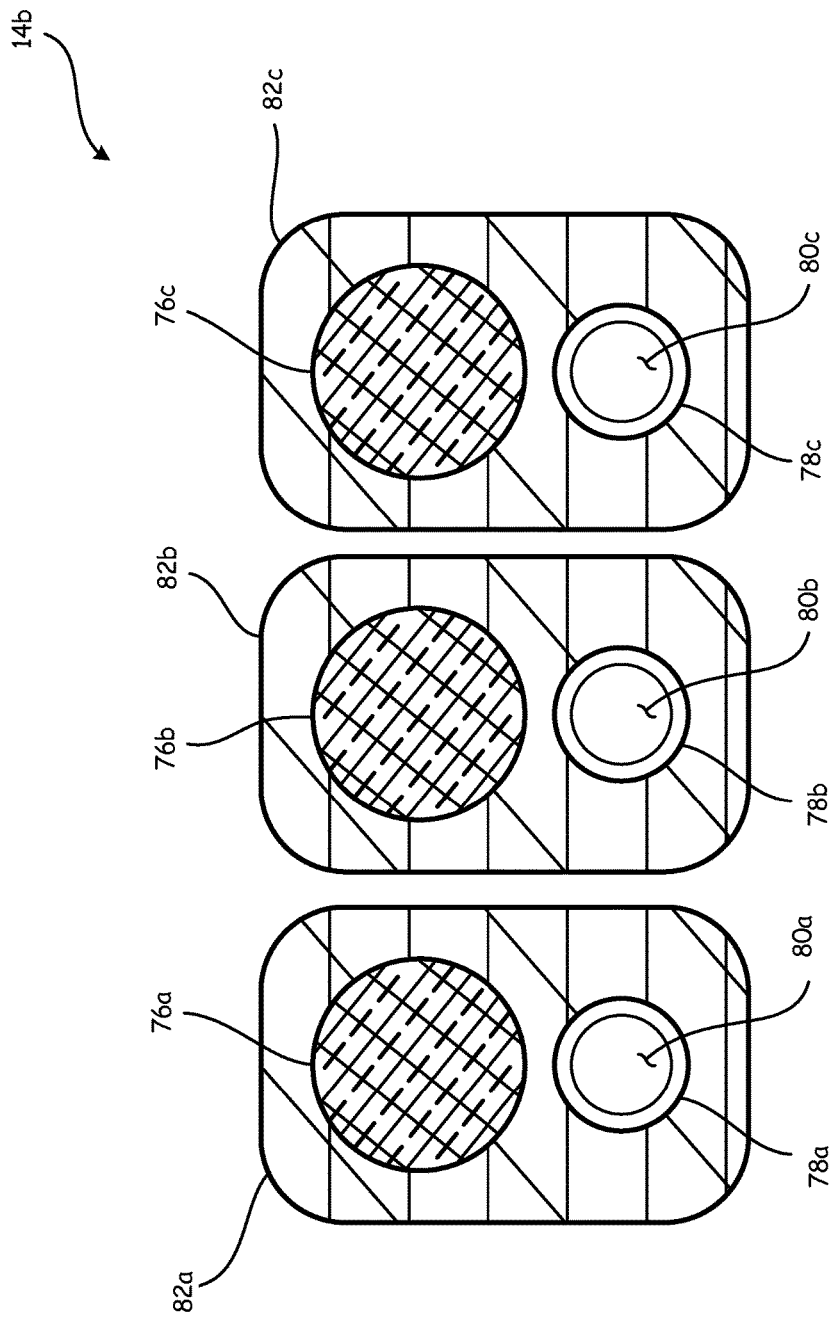
FIG. 2B is a cross-sectional view taken along line 2-2 in FIG. 1 that shows a second configuration of the integrated power and cooling cable.

FIG. 2B is a cross-sectional view taken along line 2-2 in FIG. 1 showing another embodiment of integrated power and cooling cable 14b. The reference numerals in FIG. 2B that are the same as the reference numerals in FIG. 2A represent the same components. Cable 14b is substantially similar to cable 14a except that electrically-insulating layer 82 is replaced with separate electrically-insulating layers 82a, 82b, and 82c. Each electrically-insulating layer 82a, 82b, and 82c surround a conductor-tube pair. As such, electrically-insulating layer 82a surrounds conductor 76a and tube 78a. Similarly, electrically-insulating layers 82b and 82c surround conductor 76b and tube 78b and conductor 76c and 78c, respectively. Separate electrically insulating layers 82a, 82b, and 82c increase the flexibility of cable 14b. Such a configuration can be used for the entire length of cable 14b or along portions of cable 14b which require greater flexibility. For example, separate electrically-insulating layers 82a, 82b, and 82c can be used at one or both ends of cable 14b to facilitate end connections or along a bend to improve flexibility.

Figure 2C:
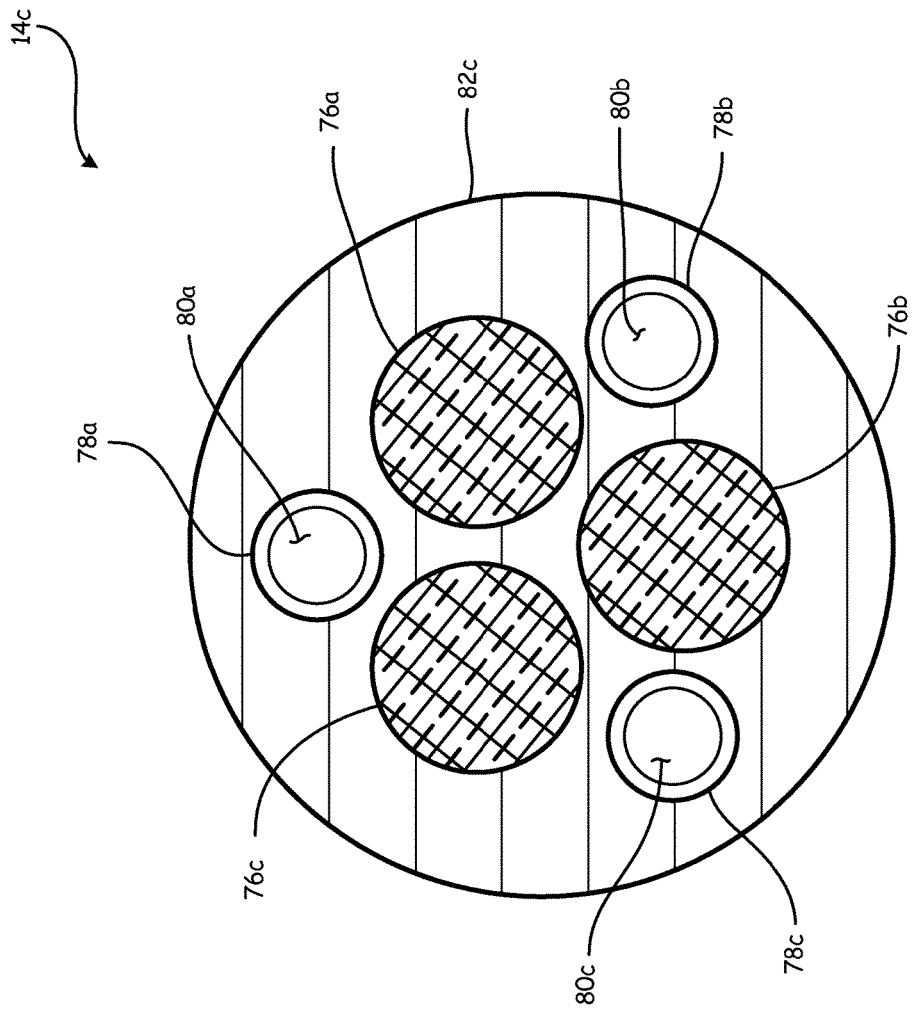
FIG. 2C is a cross-sectional view taken along line 2-2 in FIG. 1 that shows a third configuration of the integrated power and cooling cable.

FIG. 2C is a cross-sectional view taken along line 2-2 in FIG. 1 showing another embodiment of integrated power and cooling cable 14c. Cable 14c is similar to cable 14a in that the reference numerals in FIG. 2C that are the same as the reference numerals in FIG. 2A refer to the same components. However, in cable 14c, conductors 76a, 76b, and 76c are arranged such that each conductor is equidistant from the other two conductors. Thus, conductors 76a, 76b, and 76b form a triangular arrangement. Conductors 76a, 76b, and 76c can be disposed radially inward of tubes 78a, 78b, and 78c. Tubes 78a, 78b, and 78c can be similarly arranged such that each tube is equidistant from the other two tubes. Being radially outward of conductors 76a, 76b, and 76c, each tube can be disposed between two adjacent conductors to form complimentary triangular arrangements of conductors 76a, 76b, and 76c, and tubes 78a, 78b, and 78c. As with cables 14a and 14b, cable 14c has electrically-insulating layer 82c which surrounds conductors 76a, 76b, and 76c and tubes 78a, 78b, and 78c and maintains spacing among adjacent conductors and tubes.

Figure 2D:
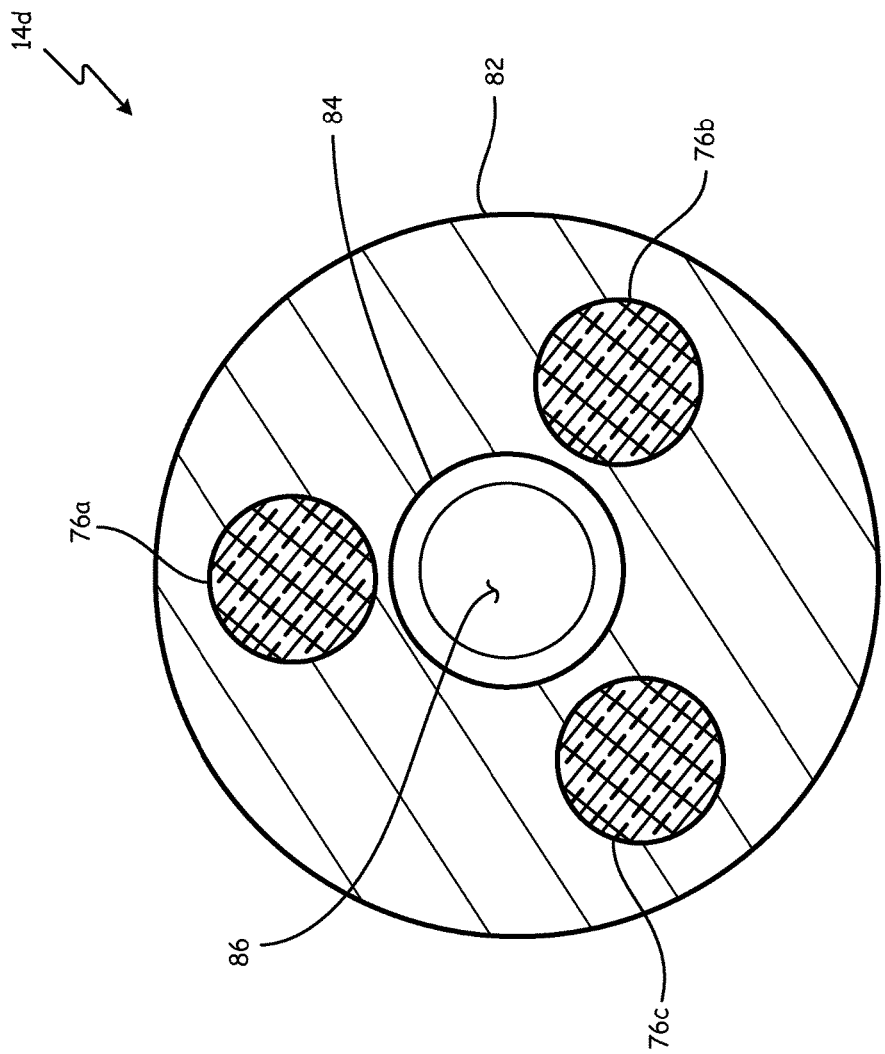
FIG. 2D is a cross-sectional view taken along line 2-2 in FIG. 1 that shows a fourth configuration of the integrated power and cooling cable.

FIG. 2D is a cross-sectional view taken along line 2-2 in FIG. 1 showing another embodiment of integrated power and cooling cable 14d. Cable 14d is similar to cable 14a in that the reference numerals in FIG. 2D that are the same as the reference numerals in FIG. 2A refer to the same components. Cable 14d differs from cables 14a, 14b, and 14c in that tubes 78a, 78b, and 78c are replaced with tube 84. Conductors 76a, 76b, and 76c are equidistant from each, but contrary to cable 14c, are radially outward from tube 84, which is centrally-located within cable 14d and defines passage 86.

Referring now to FIGS. 2A, 2B, 2C, and 2D simultaneously, passages 80a, 80b, 80c, and 84 extend from panel 74 to motor housing 46 to form secondary cooling path F2. Because panel 74 of cabinet 12 is located within pressurized zone 16, the air pressure within panel 74 is greater than the air pressure within motor housing 46 when the aircraft is at altitude. The difference between the panel pressure and the motor housing pressures drives air from panel 74 to motor housing 46 through cable 14 whether cable 14 has a cross-section according to FIG. 2A, 2B, 2C, or 2D. Additionally, the differential pressure between panel 74 and motor housing 46 must be greater than or equal to the pressure loss at a desired mass flow rate to provide secondary cooling flow F2.

For example, pressurized zone 18 can be an electrical bay (EE bay) of the aircraft, and ambient pressure zone 16 can be any other unpressurized zone of the aircraft. When the aircraft is on the ground, pressures within pressurized zone 18 and ambient pressure zone 16 are each equal to approximately 1 atmosphere or 14.7 psia. At cruising altitude (approximately 41,000 ft), the pressure within zone 18 can be 11.8 psia, and the pressure within zone 16 can be 2.72 psia. Thus, the differential pressure between zones 14 and 16 is 9.08 psia at cruising altitude and 0 psia at ground level as summarized in Table 1 below.

TABLE 1

Driving Differential Pressure of Cable 14

|  | Pressurized Zone 18 | Ambient Pressure Zone 16 | Differential Pressure (Zone 18 − Zone 16) |
| --- | --- | --- | --- |
| Ground | 14.7 psia (101.4 kPa) | 14.7 psia (101.4 kPa) | 0 psia (0 kPa) |
| Cruise | 11.8 psia (81.4 kPa) | 2.7 psia (18.6 kPa) | 9.0 psia (62.1 kPa) |

Continuing with the example, cable 14 can be approximately 30 feet (9.14 meters) long. Cable 14 can contain one or more tubes 78 defining one or more passages 80. So long as the flow through one or more passages 80 from panel 74 to motor housing 76 is greater than 0 for a given pressure loss therethrough, secondary cooling flow F2 will supplement cooling of electric motor 20. The pressure loss associated with a secondary flow F2 through cable 14 is determined using methods known in the art that include a hydraulic diameter and the length of each passage 80 extending within cable 14. Hydraulic diameter is equal to four times a cross-sectional area of passage 80 divided by the cross-sectional perimeter of passage 80. For passages that have circular cross-sections, the hydraulic diameter is equal to the diameter of the passage. As such, Table 2 illustrates three equivalent configurations of one or more tubes 78. By varying the diameter of passage 80, one or more tubes 80 can deliver equivalent mass flow rates of supplemental cooling air. In each configuration, the mass flow rate of cooling air is greater than zero.

TABLE 2

Pressure Drop due to Secondary Cooling Flow F2 through Cable 14

| Number of Tubes 78 | Passage 80 Diameter | Pressure Loss through per 30 ft. (9.14 m) of Cable 14 | Mass Flow Rate per Tube | Total Mass Flow Rate [lb/min] |
| --- | --- | --- | --- | --- |
| 1 | 0.50 in. (12.7 mm) | 9 psi (62.1 kPa) | 5.2 lb/min (2.36 kg/min) | 5.2 lb/min (2.36 kg/min) |
| 2 | 0.35 in. (8.9 mm) | 9 psi (62.1 kPa) | 2.6 lb/min (1.18 kg/min) | 5.2 lb/min (2.36 kg/min) |
| 3 | 0.30 in. (7.6 mm) | 9 psi (62.1 kPa) | 1.73 lb/min (0.787 kg/min) | 5.2 lb/min (2.36 kg/min) |

Figure 3A:
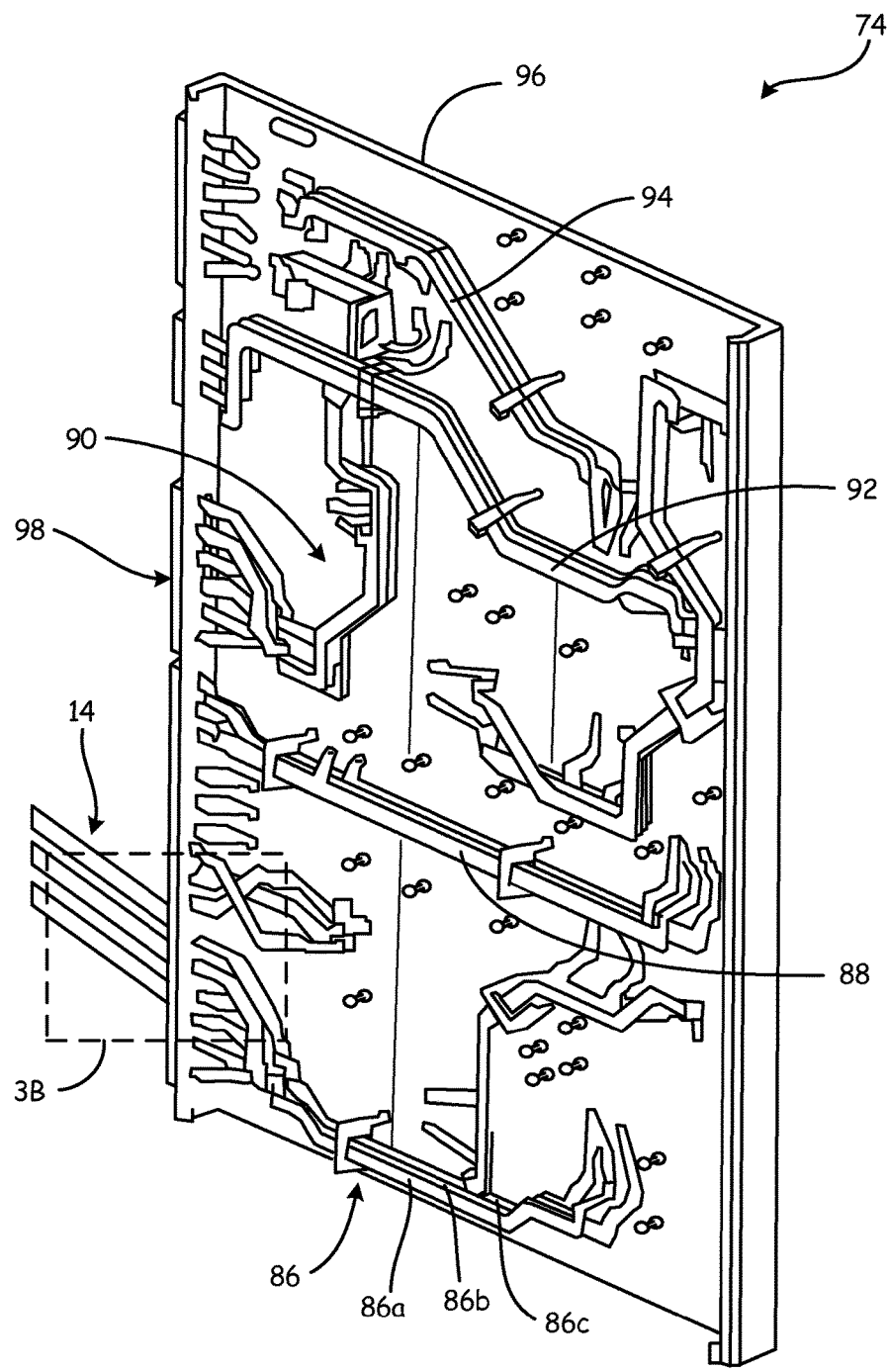
FIG. 3A is an isometric view of the cable showing an interface between the cable and a panel.

FIG. 3A is a schematic isometric view of cable 14 showing the interface between cable 14 and panel 74. Panel 74 has one or more bus bar assemblies 86, 88, 90, 92, and 94. Bus bar assemblies 86, 88, 90, 92, and 94 have one or more bus bars that extend along a surface of wall 96. The bus bars extend from a component (e.g., a motor controller) within rack 72 (not shown in FIG. 3A) through an aperture in wall 96 and along a surface of wall 96 to a location along wall 96 adjacent to an exit aperture formed by end wall 98. Cable 14 extends through the apertures of end wall 98 to interface with one of the bus bar assemblies 86, 88, 90, 92, and 94. For example, cable 14 can connected to bus bars 86a, 86b, and 86c of bus bar assembly 86.

Figure 3B:
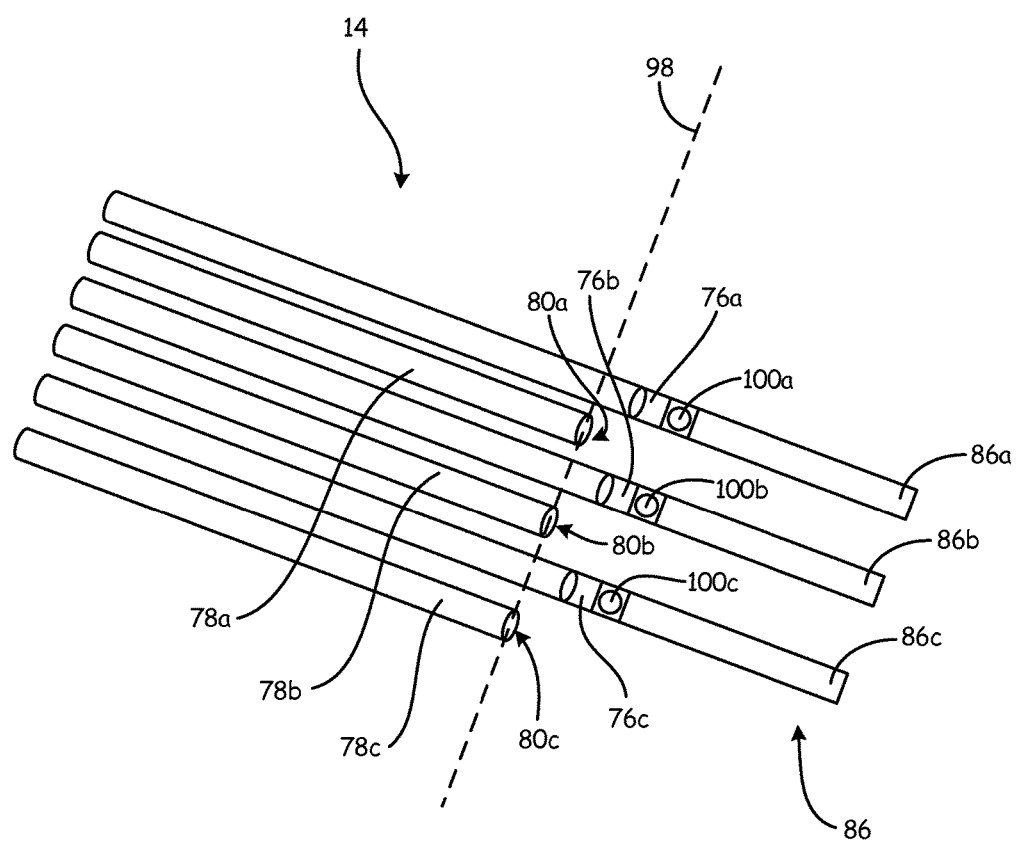
FIG. 3B is a schematic view of the interface between the cable and the panel.

FIG. 3B is a schematic view showing cable 14 extending through end wall 98 to interface with bus bar assembly 86. Conductors 76a, 76b, and 76c of cable 14 extend through end wall 98 and are electrically connected to bus bars 86a, 86b, and 86c, respectively. Tubes 78a, 78b, and 78c extend at least to end wall 98 to place passages 80a, 80b, and 80c in flow communication with the interior of panel 74 as shown in FIG. 3A.

Figure 4:
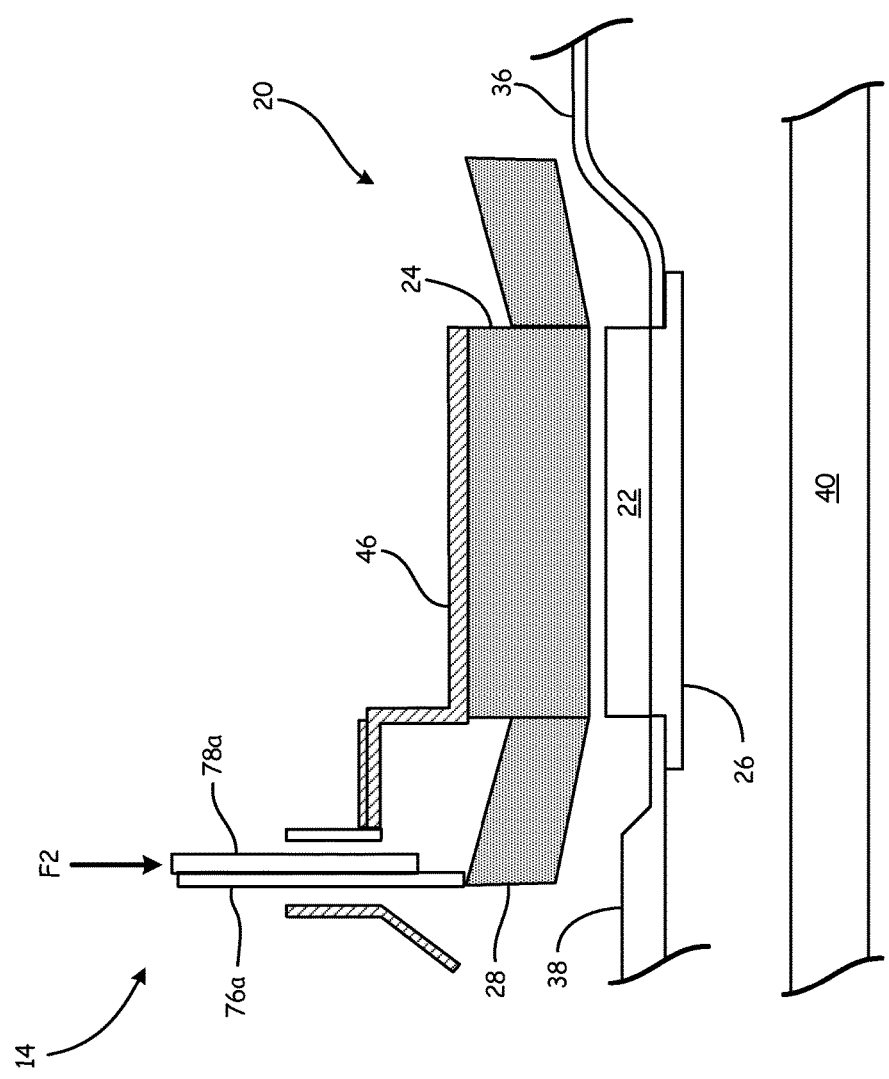
FIG. 4 is a schematic view of the cable showing an interface between the cable and the cabin air compressor.

FIG. 4 is a schematic view showing cable 14 extending into motor housing 46 to interface with windings 28 of electric motor 20. Conductor 76a of cable 14 is electrically connected with windings 28. Tube 78a extends into motor housing 46 to place passage 80a (not shown in FIG. 4) in flow communication with the interior of housing 46. Although not shown in FIG. 4, conductors 76b and 76c and tubes 78b and 78c extend into motor housing 46 in the same manner as conductor 76a and tube 78a. Tubes 78a, 78b, and 78c extend at least to an outer wall of housing 46. Tubes 78a, 78b, and 78c penetrate housing 46 at an end of electric motor 20 opposite motor outlet duct 70 (see FIG. 1). Tubes 78a, 78b, and 78c can extend further into housing 46 to direct cooling air to a region near windings 28 and/or terminate at a position within housing 46 radially outward of windings 28 with respect to axis 32.

Discussion of Possible Embodiments

The following are non-exclusive descriptions of possible embodiments of the present invention.

An assembly includes a first conductor extending from a first end to a second end, a tube extending along the first conductor between the first and second ends, and an electrically-insulating barrier surrounding the first conductor and the tube such that the tube is spaced from the first conductor. The tube is configured to permit a fluid to flow therethrough.

The assembly of the preceding paragraph can optionally include, additionally and/or alternatively, any one or more of the following features, configurations and/or additional components:

A further embodiment of the foregoing assembly can further include a cabinet in flow communication with a first end of the tube and a first duct in flow communication with a second end of the tube. A first pressure within the first duct can be less than a second pressure within the cabinet. The cabinet can be configured to mount one or more electrical components.

A further embodiment of any of the foregoing assemblies, wherein the tube has a hydraulic diameter and a length that produce a pressure drop associated with the fluid flowing therethrough, and wherein the pressure drop is less than a differential pressure between the first and second pressures.

A further embodiment of any of the foregoing assemblies can further include a controller electrically connected to the first end of the first conductor, and an electric motor electrically connected to the second end of the first conductor. The first duct communicates between an ambient environment and the electric motor.

A further embodiment of any of the foregoing assemblies can further include a compressor assembly. The compressor assembly can include an inlet duct in fluid communication with the ambient environment, a housing enclosing the motor, the first duct that is fluidly connected between the inlet duct and the housing, the electric motor, a compressor, a shaft extending from the electric motor to the compressor. The electric motor is configured to drive the compressor. The cabinet can be disposed in a pressurized zone of an aircraft, and the controller can be mounted within the cabinet.

An assembly includes a plurality of conductors, a first tube extending along at least one of the conductors, and an electrically-insulating barrier enclosing the conductors and the first tube. The barrier maintains spacing between the first tube and one or more adjacent conductors, and the tube is configured to permit a fluid to flow therethrough.

The assembly of the preceding paragraph can optionally include, additionally and/or alternatively, any one or more of the following features, configurations and/or additional components:

A further embodiment of the foregoing assembly, wherein the plurality of conductors can include a first conductor, a second conductor, and a third conductor in which the first, second, and third conductors are substantially equidistant from each other, and wherein the first tube is centrally disposed among the first, second, and third conductors.

A further embodiment of any of the foregoing assemblies can further include a second tube and a third tube, each tube extending along at least one of the conductors. The second and third tubes are configured to permit fluid to flow therethrough. The electrically-insulating barrier can enclose the second and third tubes such that the first, second, and third tubes are spaced from each conductor adjacent thereto.

A further embodiment of any of the foregoing assemblies, wherein the plurality of conductors can include a first conductor, a second conductor, and a third conductor in which the first, second, and third conductors are substantially equidistant from each other. The first, second, and third tubes are substantially equidistant from each other and disposed radially outward with respect to the plurality of conductors. Each of the first, second, and third conductors can be disposed between two of the first, second, and third conductors.

A further embodiment of any of the foregoing assemblies, wherein the plurality of conductors can include a first conductor, a second conductor, and a third conductor in which the first, second, and third conductors are disposed in a first row. The first, second, and third tubes can be arranged in a second row that is spaced from and substantially parallel to the first row.

A further embodiment of any of the foregoing assemblies can further include a second tube and a third tube in which the second and third tubes are configured to permit fluid to flow therethrough. The plurality of conductors can include a first, second and third conductors. The electrically-insulating barrier can enclose the first conductor and the first tube, which extends along the first conductor. The second electrically-insulating barrier can enclose the second conductor and the second tube, which extends along the second conductor. The third electrically-insulating barrier can enclose the third conductor and the third tube, which extends along the third conductor.

A further embodiment of any of the foregoing assemblies can further include a cabinet in flow communication with first ends of the first, second, and third tubes and a first duct in flow communication with second ends of the first, second, and third tubes. The cabinet can be configured to mount one or more electrical components. A pressure within the first duct can be less than a second pressure within the cabinet.

A further embodiment of any of the foregoing assemblies, wherein the first, second, and third tube can form parallel flow paths, and wherein the first, second and third tubes have hydraulic diameters and lengths that collectively produce a pressure drop associated with fluid flowing therethrough that is less than a differential pressure between the first and second pressures.

A further embodiment of any of the foregoing assemblies can further include a controller electrically connected to first ends of the first, second, and third conductors, and an electric motor electrically connected to second ends of the first, second, and third conductors, wherein the first duct can communicate between an ambient environment and the electric motor.

A further embodiment of any of the foregoing assemblies can further include a compressor assembly and a cable assembly. The compressor assembly can include an inlet duct in fluid communication with the ambient environment, a housing enclosing the electric motor, the first duct that is fluidly connected between the inlet duct and the housing, the electric motor, a compressor, and a shaft extending from the electric motor to the compressor. The electric motor can be configured to drive the compressor. The cable assembly can include the first, second, and third conductors, an electrically-insulating barrier, and the first, second, and third tubes. The first, second, and third conductors can be electrically connected between the controller and first, second, and third windings of the electric motor. The first, second, and third windings correspond to first, second, and third phase, respectively, of the electric motor. The cabinet can be disposed within a pressurized zone of an aircraft, and the controller can be mounted within the cabinet.

A method of manufacturing a feeder cable includes providing a plurality of conductors that extend between first and second lugs of each conductor, enclosing the plurality of conductors within an electrically-insulating layer, and forming a cooling passage within the electrically-insulating layer. The cooling passage extends along one of the conductors. The feeder cable is configured to electrically connect an electric motor to a power source.

The method of the preceding paragraph can optionally include, additionally and/or alternatively, any one or more of the following features, configurations and/or additional components:

A further embodiment of the foregoing method, wherein forming the cooling passage includes spacing a tube from one of the conductors and enclosing the tube within the electrically-insulating layer. The tube can extend along the conductor between the first and second lugs of the conductor.

A further embodiment of any of the foregoing methods, wherein forming the cooling passage includes providing a plurality of tubes. Each tube can be spaced from one of the conductors, wherein each tube extends along one of the conductors between first and second lugs of the conductor.

A further embodiment of any of the foregoing methods, wherein three conductors can be equidistant from each other, and wherein three tubes can be disposed radially outward from the three conductors. Each tube can be disposed between two adjacent conductors.

A further embodiment of any of the foregoing methods can further include passing a medium through the cooling passage from a cabinet to a housing enclosing the electric motor. The cabinet can be configured to house one or more electric components and can be disposed within a pressurized zone of an aircraft. The electric motor can be disposed within an ambient pressure zone of the aircraft. Each tube can have a hydraulic diameter and a length that produces a pressure drop associated with the medium therethrough that is less than a differential pressure between the pressurized and ambient zones.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a first conductor extending from a first end to a second end;
   a first tube extending along the first conductor between the first and second ends of the first conductor;
   a first electrically-insulating barrier surrounding the first conductor and the first tube such that the first tube is spaced from the first conductor, wherein the first tube is configured to permit a fluid to flow therethrough;
   a cabinet in flow communication with a first end of the first tube, wherein the cabinet is configured to mount one or more electrical components;
   a first duct in flow communication with a second end of the first tube, wherein a first pressure within the first duct is less than a second pressure within the cabinet;
   a controller electrically connected to the first end of the first conductor; and
   an electric motor electrically connected to the second end of the first conductor, wherein the first duct communicates between an ambient environment and the electric motor.

2. The assembly of claim 1, wherein the first tube has a hydraulic diameter and a length that produce a pressure drop associated with the fluid flowing therethrough, and wherein the pressure drop is less than a differential pressure between the first and second pressures.

3. The assembly of claim 1 and further comprising:
   a compressor assembly comprising:
      an inlet duct in fluid communication with the ambient environment;
      a housing enclosing the electric motor, wherein the first duct is fluidly connected between the inlet duct and the housing;
      the electric motor;
      a compressor; and
      a shaft extending from the electric motor to the compressor, wherein the electric motor is configured to drive the compressor;
   wherein the cabinet is disposed within a pressurized zone of an aircraft, and
   wherein the controller is mounted within the cabinet.

4. The assembly of claim 1 and further comprising:
   a second tube;
   a third tube, wherein the second and third tubes are configured to permit fluid to flow therethrough;
   a second conductor, wherein the second tube extends along the second conductor; and
   a third conductor, wherein the third tube extends along the third conductor, and wherein the first, second, and third conductors are disposed in a row;
   a second electrically-insulating barrier enclosing the second conductor and the second tube; and
   a third electrically-insulating barrier enclosing the third conductor and the third tube, wherein the first, second, and third electrically-insulating barriers extend along a common portion of the first, second, and third conductors, respectively.

5. An assembly comprising:
   a plurality of conductors, each conductor extending from a first end to a second end along one or more adjacent conductors within the plurality of conductors;
   a first tube extending along at least one of the conductors; and a first electrically-insulating barrier enclosing the conductors and the first tube, wherein the first barrier maintains spacing between the first tube and one or more adjacent conductors, and wherein the first tube is configured to permit a fluid to flow therethrough;
a cabinet in flow communication with a first end of the first tube, wherein the cabinet is configured to mount one or more electrical components therein;
a first duct in flow communication with a second end of the first tube, wherein a first pressure within the first duct is less than a second pressure within the cabinet, and wherein the first duct communicates between an ambient environment and the electric motor;
a controller electrically connected to first ends of the plurality of conductors; and
an electric motor electrically connected to second ends of the plurality of conductors.

6. The assembly of claim 5, wherein:
the plurality of conductors comprises:
 a first conductor;
 a second conductor; and
 a third conductor, wherein the first, second, and third conductors are substantially equidistant from each other; and
the first tube is centrally disposed among the first, second, and third conductors.

7. The assembly of claim 5 and further comprising:
a second tube extending along at least one of the conductors; and
a third tube extending along at least one of the conductors, wherein the second and third tubes are configured to permit fluid to flow therethrough, and wherein the first electrically-insulating barrier encloses the second and third tubes such that the first, second, and third tubes are spaced from each conductor.

8. The assembly of claim 7, wherein:
the plurality of conductors comprises:
 a first conductor;
 a second conductor; and
 a third conductor, wherein the first, second, and third conductors are substantially equidistant from each other;
the first, second, and third tubes are substantially equidistant from each other and disposed radially outward with respect to the plurality of conductors; and
each of the first, second, and third conductors are disposed between two of the first, second, and third tubes.

9. The assembly of claim 7, wherein:
the plurality of conductors comprises:
 a first conductor;
 a second conductor; and
 a third conductor, wherein the first, second, and third conductors are disposed in a first row; and
the first, second, and third tubes are arranged in a second row that is spaced from and substantially parallel to the first row.

10. The assembly of claim 8, wherein:
the cabinet is in flow communication with first ends of the first, second, and third tubes; and
the first duct is in flow communication with second ends of the first, second, and third tubes.

11. The assembly of claim 10, wherein the first, second, and third tubes form parallel flow paths, and wherein the first, second, and third tubes have hydraulic diameters and lengths that collectively produce a pressure drop associated with the fluid flowing therethrough that is less than a differential pressure between the first and second pressures.

12. The assembly of claim 10, and wherein:
the controller is electrically connected to first ends of the first, second, and third conductors; and
the electric motor is electrically connected to second ends of the first, second, and third conductors.

13. The assembly of claim 12 and further comprising:
a compressor assembly comprising:
 an inlet duct in fluid communication with the ambient environment;
 a housing enclosing the electric motor, wherein the first duct is fluidly connected between the inlet duct and the housing;
 the electric motor;
 a compressor; and
 a shaft extending from the electric motor to the compressor, wherein the electric motor is configured to drive the compressor; and
a cable assembly comprising:
 the first, second, and third conductors electrically connected between the controller and first, second, and third windings of the electric motor, wherein the first, second, and third windings correspond to first, second, and third phases, respectively, of the electric motor;
 the first, second, and third tubes, wherein the first, second, and third tubes fluidly communicate between the cabinet and the housing; and
 the first electrically-insulating barrier;
wherein the cabinet is disposed within a pressurized zone of an aircraft, and wherein the controller is mounted within the cabinet.

14. A method of manufacturing a feeder cable comprising:
providing a plurality of conductors, each conductor extending between first and second lugs of each conductor;
enclosing the plurality of conductors within an electrically-insulating layer; and
forming a cooling passage within the electrically-insulating layer, wherein the cooling passage extends along one of the conductors, and wherein the feeder cable is configured to electrically connect an electric motor to a power source;
configuring the cooling passage to pass a medium from a cabinet to a housing enclosing the electric motor, wherein the cabinet is configured to house one or more electrical components and is disposed within a pressurized zone of an aircraft, and wherein the electric motor is disposed within an ambient pressure zone of the aircraft, and wherein the cooling passage has a hydraulic diameter and length that produces a pressure drop associated with the medium flowing therethrough that is less than a differential pressure between the pressurized and ambient zones.

15. The method of claim 14, wherein forming the cooling passage includes:
spacing a tube from one of the conductors, wherein the tube extends along the conductor between the first and second lugs of the conductor; and
enclosing the tube within the electrically-insulating layer.

16. The method of claim 14, wherein forming the cooling passage includes:
providing a plurality of tubes, wherein each tube is spaced from one of the conductors, and wherein each tube extends along one of the conductors between first and second lugs of the conductor.

17. The method of claim 16, wherein three conductors are equidistant from each other, and wherein three tubes are disposed radially outward from the three conductors, and wherein each tube is disposed between two adjacent conductors.

* * * * *